United States Patent Office 3,299,024
Patented Jan. 17, 1967

3,299,024
OLEFIN POLYMERIZATION PROCESS AND THREE COMPONENT CATALYSTS THEREFOR
Gaetano F. D'Alelio, South Bend, Ind., assignor, by direct and mesne assignments, to Dal Mon Research Co., Cleveland, Ohio, a corporation of Delaware
No Drawing. Filed Mar. 19, 1963, Ser. No. 266,209
24 Claims. (Cl. 260—93.1)

This invention relates to a new and improved process for the polymerization of olefinic hydrocarbons and a novel catalyst combination for preparing high molecular weight, solid polyolefins, of high density and crystallinity. In one aspect, this invention relates to the preparation of polymers of propylene and its higher homologs using a particular catalyst combination which has unexpected catalytic activity and which results in polymeric products characterized by unusually high crystallinity. In another aspect, this invention deals with the process of preparing crystalline polymers with these new catalysts from α-olefinic hydrocarbon monomers of the formula $CH_2=CHR$, wherein R represents a hydrocarbon radical selected from the class of alkyl, alkenyl, alkynyl, aryl, cycloalkyl, and cycloalkene radicals containing one to twelve carbon atoms.

Polyethylene has been prepared by high pressure processes to produce relatively flexible polymers having a rather high degree of chain branching and a density considerably lower than the theoretical density of about 0.965. Pressures of the order of 500 atmospheres and higher and usually of the order of 1,000 to 1,500 atmospheres are commonly employed in such procedures. It has been shown in the technical literature that more dense polyethylene can be produced with certain catalysts to give polymers which have relatively little chain branching and a high degree of crystallinity. The exact reason why these catalysts give polymers of high density is not fully understood. Also, the activity of such catalysts depends ordinarily upon certain very specific catalyst combinations. Furthermore, at the present state of knowledge, the behavior of catalysts designed to produce crystalline polymer is highly unpredictable because relatively minor changes in the catalyst combination often lead to liquid polymers rather than the desired solid polymers.

A number of catalysts have been employed to polymerize ethylene to solid crystalline polymers, for example combinations that include organo-aluminum compounds, such as trialkyl aluminum compounds and alkyl aluminum halide compounds in conjunction with the transition metal halides. Thus, triethyl aluminum in conjunction with titanium tri- or tetrachloride polymerizes ethylene to crystalline polyethylene. Similarly, catalytic mixtures of ethyl aluminum sesquichloride in combination with titanium trichloride can be used to polymerize ethylene to solid crystalline polymer.

However, when catalytic mixtures of ethyl aluminum sesquichloride and titanium chloride are employed to polymerize propylene the product is predominantly a mixture of polymeric oils and rubbers with a comparatively small amount of high molecular weight crystalline product being formed. When a mixture of ethyl aluminum sesquichloride and titanium chloride are employed to polymerize propylene at a comparatively low pressure, the mixture does not act as a catalyst, and substantially no polymer is formed. However, when higher pressures are used, a slight increase in the yield of polypropylene is obtained although the yield is still very low.

Some of the catalytic mixtures that are effective for producing polyethylene cannot be used to produce crystalline, high density polypropylene. Thus, one cannot predict whether a specific catalyst, which polymerizes ethylene to crystalline polymers, will effectively produce crystalline, high-density polymers with propylene or other specific olefinic hydrocarbons.

It is an object of this invention to provide an improved process for the polymerization of α-olefinic hydrocarbons to form solid, high density, crystalline products.

It is another object of this invention to provide an improved process for the polymerization of propylene and higher α-olefinic hydrocarbons to produce solid, high density, crystalline products.

It is another object of this invention to provide novel catalyst combinations which have unexpected catalytic activity for the polymerization of α-monoolefinic hydrocarbons to form crystalline high density polymers. Other objects of this invention will be readily apparent as the description of the invention proceeds.

The above and other objects of this invention are accomplished by means of this invention wherein α-olefinic hydrocarbons either singly or in admixture are readily polymerized to high molecular weight, solid, crystalline polymers by effecting the polymerization in the presence of a catalyst composition comprising (a) a compound selected from the group consisting of halides and lower alkoxides of a transition metal selected from the group consisting of titanium, zirconium, vanadium, chromium and molybdenum;

(b) organo-aluminum halides having the formula $R''''_mAlX_n$ and $R''''_3Al_2X_3$, wherein $R''''$ is a hydrocarbon radical selected from the group consisting of alkyl, aryl, cycloalkyl, and cycloalkylene radicals, including combinations thereof, containing one to twelve carbon atoms, X is a halogen selected from the group consisting of chlorine, bromine and iodine, and m and n are integers whose sum is equivalent to the valence of aluminum;

(c) a preformed polymeric anion which is the reaction product of
(i) a

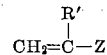

compound, wherein R' is a member selected from the class of —H and —$CH_3$, and Z represents a member selected from the class of —CN, an aryl group containing six to twelve carbon atoms, for example, phenyl, tolyl, xylyl, ethyl phenyl, naphthyl, etc., —$CON(R'')_2$ and —COOR'' wherein R'' represents a member selected from the class of aliphatic, cycloaliphatic, and aromatic hydrocarbon radicals containing one to twenty carbon atoms, and (ii) at least one component selected from the class of alkali metals, alkaline earth metals, and the hydrides and alkyl and aryl derivatives of the alkali and alkaline earth metals.

These anion reaction products are polymeric anions and are the anionic polymerization products having the general formula

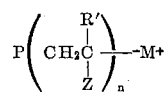

wherein P is selected from the class of H, R'' and M, M is a member selected from the class of alkaline metals, alkaline earth metals, —MAlR'''$_3$, R''' represents H and R, —MgX wherein X represents Cl, Br, and I, and n represents a numerical value of at least 4.

The transistion metal compounds used in the preparation of the new catalysts of this invention comprise the alkoxides, alkoxyhalides, and halides, such as iodides, chlorides or bromides of a transition metal selected from the group consisting of titanium, vanadium, zirconium, chromium and molybdenum. The transition metal compounds can be used at their maximum valence, or if desired, a reduced valency form of the compound can be employed. The titanium chlorides which may be in the form of titanium tetrachloride, titanium trichloride and titanium dichloride are preferred in the preparation of the new catalysts of this invention. Examples of other metal halides and alkoxides that can be employed are titanium tetrabromide, titanium tribromide, zirconium tetrachloride, zirconium tribromide, vanadium trichloride, molybdenum pentachloride, chromium tribromide, titanium tetrabutoxide vanadium triethoxide, titanium tetraoctoxide, dichlorotitanium dibutoxide, and the like.

While the exact mechanism by which the tricomponent catalysts of this invention operate is not known, they are not to be confused with catalysts prepared from two component systems. For example, a catalyst mixture from ethyl aluminum sesquichloride and titanium trichloride (cf. Example I(a)) or dipotassium octastyrene (cf. Example I(c)) do not polymerize propylene at atmospheric pressure to solid polymers. At higher pressures, these same two-component systems produce (cf. Examples I(b) and I(d)) low yield of polypropylene of reduced intrinsic viscosity and crystallinity.

On the other hand, when a three-component catalyst is used, propylene is polymerized both a low and at higher pressures in greatly higher yields to give polymers of higher crystallinity and viscosity. This improvement conceivably could be related to the fact that the bifunctional organo dianions react with the substituted aluminum halides, such as the ethyl aluminum halides and aluminum-containing polymers are obtained.

The increased activity of the catalysts of this invention may in some manner be associated with the polymeric nature of the polymeric anion component (c) as indicated by the fact that a fraction or all of this organic portion of this polymeric anion, $$P\left(CH_2\underset{Z}{\overset{R'}{C}}\right)_n M$$

is found in the polymer of the olefin, $CH_2=CHR$, produced by this novel catalyst system.

When the polymeric anion is monovalent, the polyolefin will have the anion as a terminal fragment, thus, $$P\left(CH_2\underset{Z}{\overset{R'}{C}}\right)_n\left(CH_2\underset{R}{CH}\right)_m$$

wherein $n$ is the number of molecules of $$CH_2=\underset{Z}{\overset{R}{C}}$$

and $m$ the number of $CH_2=CHR$ molecules in the polymer. In one aspect, these polymers in the broadest sense may be considered as copolymers, although when the value of $n$ is low compared to the value of $m$, the properties of the polymer of $CH_2=CHR$ dominate.

When the polymeric anion component of this new catalyst system is a dianion, such as $$M\left(CH_2\underset{Z}{\overset{R'}{C}}\right)_n M$$

all of the organic portion of the polymeric anion is found internally in the polymer as part of a diblock, thus $$\left(RHCH_2C\right)_m\left(CH_2\underset{Z}{\overset{R'}{C}}\right)_n\left(CH_2\underset{R}{CH}\right)_m$$

wherein $n$ and $m$ have the same meaning as hereinabove.

Illustrative examples of the $CH_2=CHR$ monomers which can be polymerized by the process of this invention are: $CH_2=CHCH_3$; $CH_2=CHCH_2CH_3$;
$CH_2=CHCH_2CH_2CH_3$;

$$CH_2=CH-\underset{|}{\overset{CH_3}{CH}}-CH_3$$

$CH_2=CHC_{12}H_{25}$; $CH_2=CHC_6H_{11}$; $CH_2=CHC_6H_{10}CH_3$;
$CH_2=CHC_6H_9$; $CH_2=CH-CH=CH_2$;

$$CH_2=\underset{|}{\overset{CH_3}{C}}-CH=CH_2$$

$CH_2=CH-C\equiv CCH_3$; $CH_2=CH-C_6H_4-C\equiv CCH_3$;
$CH_2=CHCH_2C_6H_5$; $CH_2=CHCH_2CH_2C_6H_5$;
$CH_2=CHCH_2C_6H_4CH_3$; $CH_2=CHC_6H_5$;
$CH_2=CHC_6H_4CH_3$; $CH_2=CHC_6H_3(CH_3)_2$;
$CH_2=CHC_6H_4C_2H_5$; $CH_2=CHC_6H_4CH(CH_3)_2$;
$CH_2=CHC_{10}H_7$; $CH_2=CHC_6H_4C_6H_5$;
$CH_2=CHC_6H_4C_6H_{11}$; $CH_2=CHC_6H_4C_6H_{13}$; etc.

Illustrative examples of the $$CH_2=\underset{Z}{\overset{R'}{C}}$$

compounds from which one of the components of the catalysts of this invention are prepared are
$CH_2=CHC_6H_5$, $$CH_2=\underset{|}{\overset{CH_3}{C}}-C_6H_5,$$

$CH_2=CHC_6H_4CH_3$, $CH_2=CHC_6H_3(CH_3)_2$,
$CH_2=CHC_6H_4C_2H_5$, $CH_2=CHC_6H_3(C_2H_5)_2$,
$CH_2=CHC_6H_4CH(CH_3)_2$, $$CH_2=\underset{|}{\overset{CH_3}{C}}C_6H_4CH_3$$

$CH_2=CHC_6H_4C_6H_5$, $CH_2=CHC_{10}H_7$,
$CH_2=CHCOOCH_3$, $CH_2=CHCOOC_2H_5$,
$CH_2=CHCOOC_{12}H_{25}$, $CH_2=CHCOOC_6H_5$,
$CH_2=CHCOOC_6H_{11}$, $CH_2=CHCOOC_6H_4CH_3$,
$CH_2=CHCOOC_6H_4C_6H_5$, $CH_2=CHCOOC_6H_4C_6H_{11}$, $$CH_2=\underset{|}{\overset{CH_3}{C}}COOCH_3, CH_2=\underset{|}{\overset{CH_3}{C}}COOC_2H_5, CH_2=\underset{|}{\overset{CH_3}{C}}COOCH_2C_6H_5,$$

$$CH_2=\underset{|}{\overset{CH_3}{\underset{|}{C}}}COOCH_2CH_2C_6H_5, CH_2=CHCON(CH_3)_2,$$

$$CH_2=\underset{|}{\overset{CH_3}{C}}CON(CH_3)_2, CH_2=\underset{|}{\overset{CH_3}{C}}CON(C_2H_5)_2, CH_2=\underset{|}{\overset{CH_3}{C}}CON\underset{C_6H_5}{\overset{CH_3}{\diagdown}},$$

$$CH_2=CHCON(C_4H_9)_2, CH_2=CHCON\underset{C_6H_4}{\overset{C_2H_5}{\diagdown}},$$

$$CH_2=CHCON(C_{12}H_{25})_2, \text{etc.}$$

The $$P(CH_2-\underset{Z}{\overset{R'}{C}}-)-M^+$$

product used in preparing the new catalysts of this invention are easily synthesized by reacting the free metal, the hydride or the alkyl derivatives of the alkali and alkaline earth metals with a $$CH_2=\underset{Z}{\overset{R'}{C}}$$

compound in the proportion desired. Depending on the conditions of the preparation, the particular alkali or alkaline earth metal or its derivative used and the particular $$CH_2=\underset{Z}{\overset{R'}{C}}$$

compound employed, either a monoanionic or a dianionic product is obtained. The monoanions can be prepared by reacting an alkali metal hydride such as NaH, LiH, KH, CsH, LAlH₄, LiAlH₄, etc., with a

monomer. Designating such hydrides as MH, the reaction involves an initiating step,

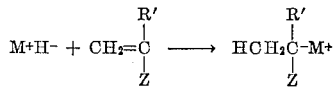

When an alkali metal hydrocarbon is used, the initiating step is given as

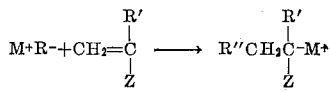

in which the cation M⁺ represents Li, Na, K, Cs, etc., and the anion, R″, represents a hydrocarbon radical containing one to twenty carbon atoms, e.g., methyl, ethyl, propyl, isopropyl, butyl, amyl, isoamyl, benzyl, triphenyl methyl, phenyl, octyl, cyclopentyl, cyclohexyl, etc. A few typical examples of MR are C₂H₅Li, C₄H₉Li, C₄H₉K, C₅H₁₁Na, C₆H₅CH₂Cs, (C₆H₅)₃CNa, C₆H₅C(CH₃)₂—K allyl sodium, etc. The MH and RM initiators can also be used as complexes with AlR₃ compounds such as AlH₃, (C₂H₅)₃Al, (C₄H₉)₃Al, (C₄H₉)AlH₂, (C₄H₉)₂AlH, (C₁₂H₂₅)₃Al, (C₂H₅)₂AlC₆H₅, etc. A Grignard reagent R″MgX can also be used to initiate an anionic polymerization, thus

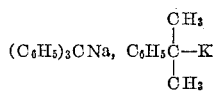

A few illustrative examples of RMgX are phenyl magnesium bromide, butyl magnesium bromide, butyl magnesium chloride, vinyl magnesium bromide, allyl magnesium iodide, etc.

The free alkali metals can also be used for the initiation step, especially when the metal, M°, gives up an electron to form an ion radical of the

compound, thus

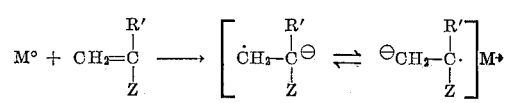

The ion radicals formed couple to form a dianion, thus

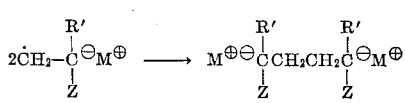

as the initiating step.

A similar dianionic mechanism occurs in the anionic initiation using an alkali metal and a polycyclic, aromatic hydrocarbon, such as for example, with naphthalene, anthracene, α-methyl styrene tetramer, etc., as illustrated by naphthalene, thus

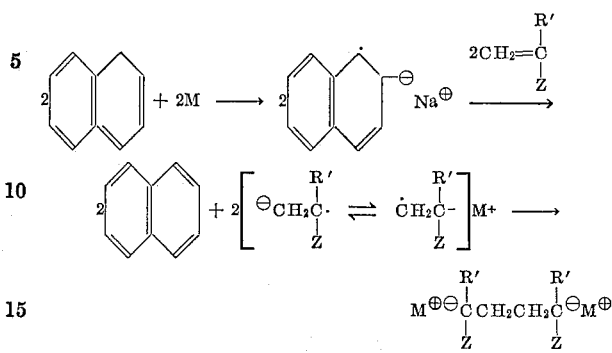

In a similar way, dianionic initiation may be brought about by ketyls which are the reaction products of an alkali or alkaline metal with a ketone such as benzophenone, thus

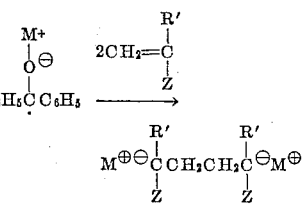

Dianionic initiation can also be brought about with certain alkali metals in liquid ammonia, such as in the case of Li in liquid ammonia, in which case an ion radical is formed which acts as the initiator, thus $$\text{Li} \xrightarrow{2NH_3} \text{Li(NH}_3) + e^-(NH_3)$$

where $e^-$ is an electron, then

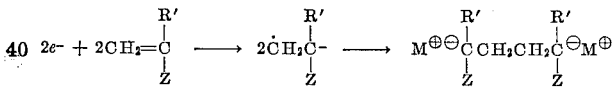

In the ammonia series the reactivity of the cations is given as K>Na>Li>Ca>Sr>Ba. After initiation, propagation occurs by addition of more

compounds.

In the monoions propagation occurs at only one active site, thus

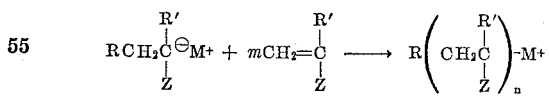

wherein $n = m+1$, and in the dianions, propagation occurs at two terminal active sites, thus

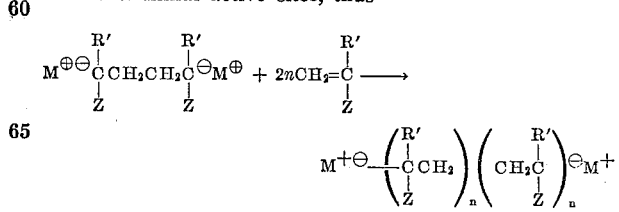

It is obvious that the value of $n$ is determined by the mole ratio of the monomer,

to the initiator. For example, in the case of a mono-anion, as illustrated in the use of Li+ as the counter ion, when 4, 10, or 100 moles of

are used per mole of RM initiator, the value of $\bar{n}$ corresponds on an average to these values, thus, respectively,

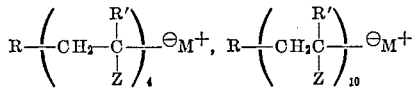

and

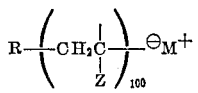

and a similar relationship is found in the dianions, thus

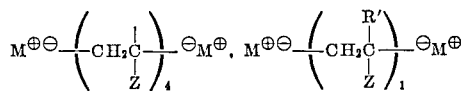

and

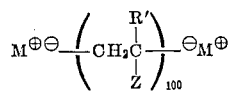

If desired, the value of $n$ can be as high as 1000 or more, though in the preparation of the catalysts of this invention, they require longer periods of time to complex with the aluminum compounds and the transition metal compounds to produce active catalysts. Thus it may be seen that any value of $n$ can be used; the preferred average value of $n$ is at least 4. These anions can be prepared from a single

compound, or a multiplicity of such compounds, as for example, 2, 3, or 4 more. These anions can be readily prepared by reacting the

compounds with the initiators of the type described hereinabove, alone or in the presence of diluent, and at temperatures ranging from about −80° C. to 100° C. or higher. However, for most

compounds a temperature of −10° C. to 60° C. is satisfactory. In general, −20° C. to 40° C. is more practical. The solvents, or diluents, are preferably selected from the class of aliphatic, cycloaliphatic and aromatic hydrocarbons of the type described as diluents for the polymerization of the olefinic $CH_2=CHR$ monomers. They can also be prepared in the ketone, ether and other solvents, such as dimethyl ether, dibutyl ether, tetrahydrofurane, dioxane, diphenyl ether, dibenzyl ether and the like. However, since these types of solvents somewhat retard and inhibit the polymerization of the $CH_2=CHR$ olefins with the complex catalysts of the kind described in this invention, these solvents are removed by distillation at low pressures from the anions and the residual anion used as such or dispersed or dissolved in dry inert hydrocarbons of the type used in the polymerization of the olefin.

The following procedures illustrate the preparation of the polymer anions used in the preparation of this invention.

PREPARATION NO. 1

(a) To 3000 ml. of dry benzene maintained under a nitrogen atmosphere in a reaction flask is added 406 grams of freshly distilled styrene. The mixture is cooled to 5° C., and then there is added 64 parts of BuLi as a 30% solution in benzene. The reaction mass is stirred for 4 hours, and there is obtained a solution of the polymer anion,

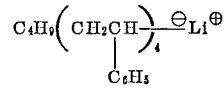

(b) When 624 grams of styrene are used in procedure (a), then the polymer anion obtained is

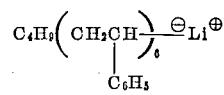

(c) When 1040 grams of styrene are used in procedure (a), then the polymer anion obtained is

(d) When 104 grams of styrene and 0.64 grams of BuLi, and 500 ml. of benzene are reacted by this procedure, then the polyanion obtained is

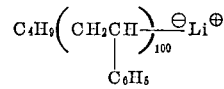

When, instead of BuLi in this procedure, there is used equivalent molar amounts of BuK, BuNa, $CH_3Li$, $C_2H_5Li$, $C_6H_5CH_2Li$, and $C_{12}H_{25}Na$., etc., then the corresponding polymeric anions,

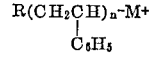

are obtained.

PREPARATION NO. 2

To a reaction flask are added in a dry nitrogen atmosphere 1180 grams (10 moles) of freshly distilled alpha-methyl styrene and 78.2 parts (2 moles) of micronized potassium. The mixture is agitated at 15° C. for 18–19 hours, following which the viscous solution is filtered in an inert atmosphere and distilled at 0.5 mm. to remove 530–550 gm. of alpha-methyl styrene, leaving 430–550 gm. of the alpha-methyl styrene dianion,

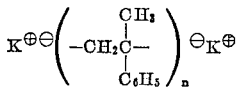

wherein the average value of $n$ is about 5. To this is added with stirring 1100 ml. of dry redistilled toluene to produce a dispersion for use in the preparation of the catalysts of this invention. The alpha-methyl styrene can also be polymerized using metallic sodium, metallic lithium or alloys of the alkali metals, the reaction with sodium being considerably slower than with potassium, and lithium is intermediate to potassium and lithium. The value of $n$ can be readily controlled by adjusting the ratio of the moles of

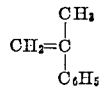

to the moles of metal and by the extent to which the reaction is allowed to proceed.

PREPARATION NO. 3

To 500 parts of anhydrous ethyl ether in a suitable reaction vessel, there is added under a dry nitrogen atmosphere, 20 milliequivalents of lithium naphthalene prepared and assayed by the process described in J.A.C.S., 58, 5442 (1936) and the mixture cooled to −78° C. To this green-black solution is added 150 milliequivalents (15.6 parts) of styrene and the color changes to dark red. This contains the polystyrene dianion

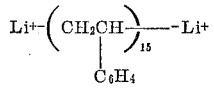

(This dianionic character can be confirmed by conversion to the dicarboxylic acid according to the procedure in Nature, 17, 1168 (1956) and J.A.C.S., 78, 2656 (1956).) To the ether solution is added 100 parts of benzene, following which all of the ether is removed by distillation to 60° C., leaving the polymer dianion in the benzene solution to be used in the preparation of the catalysts of this invention.

When instead of 150 milliequivalents of styrene there are used 40, 80, 100 or 1000 milliequivalents, then the average values of $n$ are 4, 8, 10, and 100, respectively. In this procedure, an equivalent amount of sodium benzophenone can be used instead of the lithium naphthalene to obtain the equivalent sodium dianions.

PREPARATION NO. 4

(a) The procedure of preparing No. 3 is repeated four times, using 50, 80, 100, and 1000 milliequivalents of methyl acrylate and there are obtained the polymeric dianions,

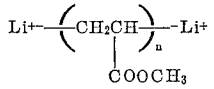

wherein $\bar{n}$ corresponds to 5, 8, 10, and 100. When the methyl acrylate of this procedure is replaced by equivalent amounts of methyl methacrylate, ethyl methacrylate, phenyl methacrylate, dodecyl acrylate, octadecyl acrylate, secondary butyl acrylate, then the corresponding dianions of the structure

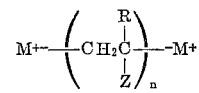

are obtained.

(b) The procedure of Preparation 3 is repeated using 50 milliequivalents of ethyl acrylate and the reaction allowed to proceed 2 hours at 178° C., following which is added 80 milliequivalents of ethyl methacrylate and the reaction allowed to proceed for 2 additional hours. There is obtained the block dianion,

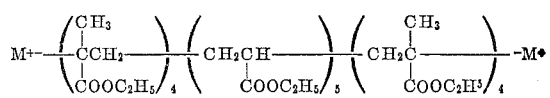

(c) When Preparation 4(b) above is repeated using a mixture of the ethyl acrylate and ethyl methacrylate, then a random copolymer dianion,

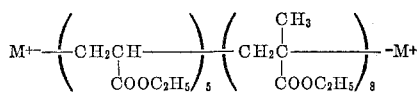

is obtained.

PREPARATION NO. 5

The procedure of Preparation No. 3 is repeated using (a) benzene, (b) toluene, (c) hexane, and (d) heptane respectively as the solvents instead of ether, and dispersions or solutions of the polymer anions are obtained.

In a similar manner, using the procedures of Preparation No. 3, are prepared the polymer anions of

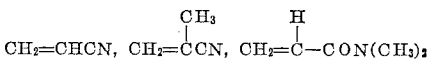

By removal of the ether by filtration or evaporation, there is isolated the polymer anions which can be dispersed in hydrocarbon solvents, or used as isolated solids in the preparation of the catalysts for olefin polymerization.

PREPARATION NO. 6

To 500 ml. of anhydrous, redistilled ether in a suitable reaction flask, cooled to 0° C., is added 300 milliequivalents of styrene and 30 milliequivalents of $C_4H_9MgBr$ in 20 ml. of ether, and the reaction allowed to proceed for 3 hours at 0° C., and 10 hours at 25° C., following which the ether is replaced by benzene as in the Preparation No. 3. There is obtained in solution the polymeric anion

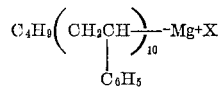

When 1, 5, 10, 20, and 50 milliequivalents respectively of $C_4H_9MgBr$ are used instead of 30, the average value of $\bar{n}$ in the polymer anions respectively are $\overline{300}$, $\overline{60}$, $\overline{30}$, $\overline{15}$, and $\overline{6}$.

In a similar manner can the polymer anions of the

compounds to be used in the practice of this invention be prepared.

PREPARATION NO. 7

The procedure of Preparation No. 3 is repeated twice, using 40 milliequivalents of $LiAlH_4$ and $LiAl(C_4H_9)_3H$, and there are obtained the polymer anions

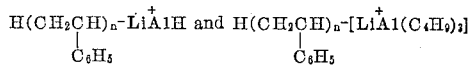

respectively, wherein $\bar{n}=4, 8, 10, 15, 100$.

PREPARATION NO. 8

The procedure of Preparation No. 3 is repeated three times, using 40 milliequivalents respectively of the complexes $LiAlH_3C_4H_9$, $LiAl(C_4H_9)_3H$, $LiAl(C_4H_9)_4$. There are obtained respectively the anions

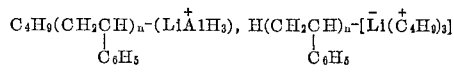

and

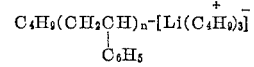

wherein $n=4, 8, 10, 15, 100$.

The polymerization process of this invention is carried out in liquid phase in an inert organic liquid, preferably in an inert liquid hydrocarbon vehicle, but the process can be performed in the absence of an inert diluent. The process proceeds satisfactorily over a temperature range of from about 20° C. to 250° C., although it is preferred to operate within the range of from about 50° C. to about 150° C. Likewise, the reaction pressures may be varied widely from about atmospheric pressure to very high pressures of the order of 10,000 p.s.i. or higher. A particular advantage of this invention is that pressures of the order of 30–750 p.s.i. give good results, and it is not necessary to employ the extremely high pressures which were necessary heretofore. The pressure used is generally only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

This invention is of particular importance in the production of highly crystalline polypropylene, the polybutenes and polystyrene although it can be used for polymerizing ethylene and mixtures of ethylene and propylene, as well as other $\alpha$-monoolefins containing up to 12 carbon atoms. The polyethylene which is obtained in accordance with this invention has a softening point greater than 120° C.

The process of the invention readily produces solid polymers having molecular weights greater than 1000 and usually greater than 10,000. Furthermore, polymers having molecular weights of as much as 1,000,000 or higher can be easily prepared if desired. The high molecular weight, high density polyethylenes of this invention are insoluble in solvents at ordinary temperatures, but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The new catalysts of this invention are very useful for polymerizing propylene to form a crystalline, high-density polymer. The polypropylene produced has a softening point above 155° C. and a density of 0.91 and higher.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The polymerization can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range.

In the continuous process, the temperature is desirably maintained at a substantially constant level within the selected range in order to achieve the highest degree of uniformity. Since it is desirable to employ a solution of the monomer of relatively high concentration, the process is desirably effected under a pressure of from 30 to 750–1000 p.s.i. obtained by pressuring the system with the monomer being polymerized. The amount of vehicle employed can be varied over rather wide limits with relation to the monomer and catalyst mixture.

Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The three component catalysts used in the practice of this invention can be varied over a wide range of composition. The molar ratio of the transition metal compound (1) to the organoaluminum halide compound (2) can be varied, for example, from 1:0.25 to 1:5, with the preferred ratio being 1:0.5 to 1:2, and the molar ratio of the polymer anion (3) to the aluminum compound (2) can also be varied over a wide range from 10:1 to 1:5, with the preferred ratio being 3:1 to 1:3. However, it will be understood that higher and lower ratios of 1:2:3 are within the scope of this invention. An overall effective range of molar ratio for the 1–2–3 components is from 1:0.5:0.25 to 1:2:6.

The polymerization time can be varied as desired and will usually be in the order of from 10 minutes to several hours in batch processes, with 1 to 5 hours being commonly employed in autoclave type reactions. When a continuous process is employed, the contact time in the polymerization zone can also be regulated as desired. In some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic hydrocarbon employed can be an alkane or cycloalkane such as pentane, hexane, heptane, or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, including halogenated aromatic compound such as chlorobenzene, chloronaphthalene or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono- and dialkyl naphthalenes, n-pentane, isooctane, methyl cyclohexane, tetralin, decalin and any of the other well-known inert liquid hydrocarbons.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable $\alpha$-monoolefin.

The polymerization ordinarily is accomplished merely by admixing the components of the polymerization mixture, and no additional heat is necessary unless it is desired to effect the polymerization at an elevated temperature in order to increase the solubility of polymeric product in the vehicle. When using the continuous process wherein the relative proportions of the various components are maintained substantially constant, the temperature is desirably controlled also within a relatively narrow range.

The invention is illustrated by the following examples and preferred embodiments thereof, although it will be understood that the invention is not limited thereby except as indicated in the claims. Unless otherwise specifically indicated, parts and percentages are by weight.

13
Example I (a) A 500 ml. pressure flask is charged in a nitrogen-filled dry box with 200 ml. of dry hexane and 3.02 g. of a catalyst mixture comprising a 2:3 molar ratio of ethylaluminum sesquichloride (1.64 g.) and titanium trichloride (1.38 g.). The charged flask is transferred to a thermostated oil bath at 80° C. and attached to a source of proplyene maintained at 30 p.s.i. propylene pressure, and the flask shaken continuously for six hours. The flask is then detached from the propylene source and dry methanol added to the mixture to destroy the catalyst. No polypropylene was formed under these conditions.

(b) Procedure (a) of this example is repeated using instead of a flask, a stirred 1-liter autoclave at 80° C. at 1000 p.s.i. of propylene pressure for 8 hours, after which the pressure is released, methanol is added to destroy the catalyst, and the polymer isolated and dried. The weight of solid polypropylene is 26 grams, its inherent viscosity is 1.50, and its crystallinity is 28%.

(c) Procedure (a) of this example is repeated using 2.69 g. of a catalyst mixture comprising 1.31 g. of

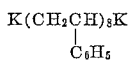

and titanium trichloride (1.38 g.). No polypropylene is formed under these conditions.

(d) Procedure (b) of this example is repeated using 2.69 g. of the catalyst mixture comprising 1.31 g. of

and titanium trichloride (1.38 g.) and 6.8 g. of polypropylene is obtained of inherent viscosity of 0.53 and its crystallinity is 22%.

Example II

The procedure of Example I(a) is repeated using 1.64 g. of ethyl aluminum sesquihalide, and 1.38 gm. of titanium trichloride in 200 ml. of dry hexane, to which is added 1.31 gm. of

followed by intimate mixing to insure complex formation to give an ethylaluminum sesquichloride, titanium halide, polymer anion ratio of 2:3:0.5. A total of 16.4 grams of highly crystalline polypropylene of inherent viscosity of 3.8 is obtained after washing the polymer with methanol and drying.

Similar results are obtained when 2.62 gms. of the monoion

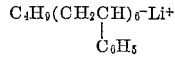

are used instead of the dianion to give an aluminum sesquihalide, titanium halide, polymer anion ratio of 2:3:1.

Example III

The procedure of Example I(b) is repeated using in 500 ml. of hexane, 1.64 g. of ethylaluminum sesquichloride, 1.38 g. of titanium trichloride, and 1.31 g. of

which are intimately mixed at room temperature for 45–60 minutes, then charged with propylene at 1000 p.s.i. and reacted at 80° C. for 4 hours. There is obtained 251 g. of polypropylene with an inherent viscosity in tetralin at 145° C. of 2.06 and a crystallinity of 95.9% by hexane extraction.

Example IV

In an inert atmosphere there is charged into a 500 ml. stainless steel rocking autoclave 200 ml. of dry mineral spirits of B.P. 180–190° C., 4 gm. of a 2:3:5 molar ratio of ethylaluminum sesquichloride, titanium trichloride, and

and 200 parts of dry liquid propylene, then heated while being rocked at 85° C. for 6 hours. The catalyst is then destroyed by methanol addition and the polymer treated with hot anhydrous isobutyl alcohol and dried. There is isolated 127.3 grams of highly crystalline polypropylene of inherent viscosity of 4.82.

Example V

Example IV is repeated pressuring the autoclave with dry hydrogen at 50 p.s.i. partial pressure prior to polymerization, and the inherent viscosity of the polymer is reduced to 2.5. In a similar experiment, the partial pressure of the hydrogen is increased to 500 p.s.i., and the inherent viscosity of the propylene is reduced to 0.5.

Example VI

The procedure of Example IV is repeated in the absence of solvent and 196.3 grams of highly crystalline polypropylene of inherent viscosity 5.1 is obtained.

Example VII

The procedure of Example IV is repeated to polymerize 100 g. of 3-methyl-1-butene using 2.6 g. total catalyst made up of a 2:2:1 molar ratio of ethylaluminum sesquichloride, vanadium trichloride, and

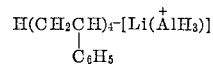

A 73.8 g. yield of highly crystalline poly(3-methyl-1-butene) is obtained of inherent viscosity 1.9.

Example VIII

The procedure of Example IV is repeated to polymerize 100 g. of styrene using 2.6 g. total catalyst and a 1:1:3 molar ratio of ethylaluminum sesquibromide, vanadium trichloride, and

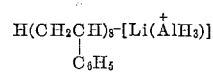

A 67.4 g. yield of highly crystalline polystyrene is obtained having an inherent viscosity of 2.63.

Example IX

The procedure of Example IV is repeated to polymerize 100 g. of allylbenzene using 4.9 total catalyst and 2:1:3 molar ratio of cyclohexylaluminum sesquichloride, zirconium tetrachloride, and

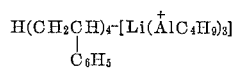

A 64.3 g. yield of highly crystalline poly(allylbenzene) is obtained.

Example X

The procedure of Example IV is repeated to polymerize 100 g. of vinylcyclohexane using 2 g. total catalyst comprising a 1:1:1 molar ratio of phenylaluminum sesquichloride, molybdenum pentachloride, and

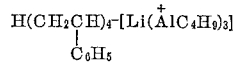

A 54.6 g. yield of highly crystalline poly(vinylcyclohexane) of inherent viscosity 2.1 is obtained.

Example XI

The procedure of Example IV is repeated to polymerize 100 g. of butadiene using a 2:3:2 molar ratio of tolylaluminum sesquichloride, titanium trichloride and

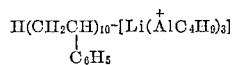

An 88.4 g. yield of polybutadiene of inherent viscosity 1.9 is obtained. Similar results are obtained by using either vanadium, tetrabutoxide, or titanium tribromide in place of the titanium trichloride above, and likewise when vinyl methyl-acetylene is substituted for the butadiene.

Example XII

The procedure of Example I(a) is repeated using 3 g. of a catalyst mixture which comprised a 2:2:1 molar ratio of ethylaluminum dichloride, titanium trichloride, and

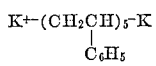

The flask and its contents are heated to 75° C. under 30 p.s.i. propylene pressure and maintained under these conditions for a total of 6 hours. The reaction flask is detached then from the shaking apparatus, dry isobutyl alcohol is added to deactivate the catalyst, and then the polymer is washed with hot, dry isobutanol to remove the catalyst residues. A total of 23.6 g. of highly crystalline polypropylene is obtained having an inherent viscosity in tetralin at 145° C. of 2.11 and a density of 0.918.

When the example is repeated using only the ethylaluminum dichloride and titanium trichloride, no solid polypropylene is formed under the above conditions.

Example XIII

Example IV is repeated using 4 g. of a 1:1:0.25 molar ratio of ethylaluminum dibromide, titanium trichloride, and

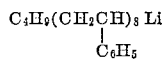

and the mixture was heated to 85° C., for 6 hours. The polymer is worked up as described in Example IV to give a yield of 70 g. of highly crystalline polypropylene having an inherent viscosity of 2.87 in tetralin at 145° C. When hydrogen is admitted to the polymerization vessel and is maintained there at 50 p.s.i. partial pressure, the inherent viscosity of the product is 1.50. An increase in the hydrogen pressure to 500 p.s.i. in a similar run produces a very low molecular-weight crystalline polypropylene of inherent viscosity 0.27.

Example XIV

The procedure of Example XIII is used to polymerize propylene with no solvent present. One hundred grams of propylene monomer are used and within the 6-hour polymerization period at 85° C., a 63.0 g. yield of highly crystalline polypyropylene of inherent viscosity 3.12 is obtained.

Example XV

The procedure of Example XIII is employed to polymerize 50 g. of 3-methyl-1-butene using 3 g. of catalyst made up of ethylaluminum dichloride, zirconium tetrachloride and

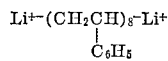

in a molar ratio of 2:1:1.5. The yield is 54 g. of highly crystalline poly(3-methyl-1-butene) having an inherent viscosity of 2.21 and a crystalline melting point of about 240° C.

Example XVI

The procedure of Example XIII is used to polymerize 50 g. of styrene using 0.5 g. of catalyst comprised of ethylaluminum dichloride, vanadium trichloride and

in a 1:3:1 molar ratio. A 40-g. yield of crystalline polystyrene is obtained. This polymer had an inherent viscosity of 3.00 and a crystalline melting point of 238° C.

Example XVII

The procedure of Example XIII is employed to polymerize allylbenzene using 2 g. of a catalyst comprised of ethylaluminum dibromide, chromium trichloride and

in a 1:1:0.5 molar ratio. The yield of crystalline poly(allylbenzene) is 57%.

Example XVIII

The procedure of Example XIII is employed to polymerize vinylcyclohexene using 2 g. of catalyst composed of a 2:1:1.5 molar ratio of ethylaluminum dichloride, molybdenum pentachloride and

A 42% yield of highly crystalline poly(vinylcyclohexene) having an inherent viscosity of 1.96 is obtained.

Example XIX

The procedure of Example XIII is employed to polymerize 100 g. of butadiene using a 1:2:1 molar ratio of ethylaluminum dichloride, titanium tribromide and

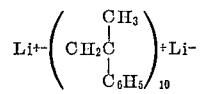

An 87 g. yield of polybutadiene of inherent viscosity 1.93 is obtained.

Example XX

The procedure of Example I is repeated using 20 g. of 4-methyl-1-pentene and 1 g. of a catalyst consisting of ethylaluminum dichloride, titanium trichloride and

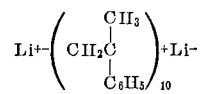

in a molar ratio of 1:3:2 and reacted at 70° C. for 24 hours. At the end of this period, the flask is cooled and the polymer dissolved in hot xylene and reprecipitated by the addition of dry isobutanol to the xylene solution. The polymer is washed several times with hot isobutanol and dried. The crystalline poly(4-methyl-1-pentene) weighed 14.3 g. and melts at about 203° C.

Example XXI

In a nitrogen-filled dry box, a total of 2 g. of catalyst was added to a 500-ml. pressure bottle containing 100 ml. of dry heptane. The catalyst is made up of $(C_2H_5)_2AlCl$, titanium tetrachloride, and

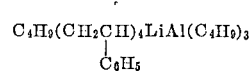

in a molar ratio of 1:1:1. The pressure bottle is then attached to a source of propylene, and the reaction mixture is agitated, heated to 75° C. and maintained under 30 p.s.i. propylene pressure for 8 hours. At the end of this time the bottle is removed from the propylene source, dry isobutanol is added to deactivate the catalyst, and then the polymer is washed with hot, dry isobutanol to remove the catalyst residues. The yield of highly crystalline polypropylene is 28.4 g., with an inherent viscosity in tetralin at 145° C. of 2.10 and a density of 0.916.

*Example XXII*

Inside a nitrogen-filled dry box, a 500 ml. stainless steel autoclave is loaded with 2 g. of catalyst comprising a 3:4:2 molar ratio of $(C_4H_9)_2AlCl$, titanium trichloride, and $$H(CH_2CH)_4Li(C_4H_9)_3$$
$$| $$
$$C_6H_5$$

and 100 ml. of dry mineral spirits (B.P. 190° C.). The autoclave is sealed, placed in a rocker, and 50 g. of dry, liquid propylene is added. The mixture is heated to 85° C. and maintained at this temperature for 6 hours. The polymer is worked up as described in Example XXI to give 38 g. of highly crystalline polypropylene having an inherent viscosity of 2.80 in tetralin at 145° C. When hydrogen is admitted to the polymerization vessel and maintained there at 50 p.s.i., partial pressure, the inherent viscosity of the product is 1.60.

*Example XXIII*

The procedure of Example XXII is used to polymerize propylene with no solvent present. One hundred grams of liquid propylene monomer is used and 86.5 g. of high crystalline polypropylene of inherent viscosity 3.14 is obtained.

*Example XXIV*

The procedure of Example XXIII is employed to polymerize 50 g. of 3-methyl-1-butene using 3 g. of the same catalyst in a molar ratio of 1:2:2. The yield is 38 g. of highly crystalline poly(3-methyl-1-butene) having an inherent viscosity of 1.94 and a crystalline melting point of 242° C.

*Example XXV*

The procedure of Example XXI is repeated using $ZrCl_4$ instead of $TiCl_4$ and the yield of crystalline polypropylene is 36.4 grams.

*Example XXVI*

Example XVI is repeated using 2.4 g. of a catalyst made up of ethylaluminum dichloride, titanium trichloride and $$Li(CH_2CH)_{15}Li$$
$$|$$
$$CN$$

in a 1:1:1.5 molar ratio and 43 g. of crystalline polystyrene is obtained.

*Example XXVII*

Example XXVI is repeated using 2.5 gm. of a catalyst made up of ethylaluminum sesquichloride, chromium trichloride, and $$Li-\left(CH_2\underset{COOC_2H_5}{\overset{H}{C}}\right)_4-Li$$

in a 1:1:1 molar ratio and 34.6 g. of highly crystalline polystyrene is obtained.

*Example XXVIII*

Example XXVI is repeated using 3.0 g. of a catalyst made up of ethylaluminum sesquichloride, titanium tetrachloride and $$Li-\left(CH_2-\underset{COOCH_3}{\overset{CH_3}{C}}\right)_8-Li$$

in a molar ratio of 1:1:1.5, and 42.1 grams of crystalline polystyrene is obtained.

*Example XXIX*

Example XXVI is repeated using butyl aluminum sesquichloride, titanium trichloride and $$Li\left(CH_2\underset{CN}{\overset{CH_3}{C}}\right)_4Li$$

and 38.6 g. of crystalline polystyrene obtained.

*Example XXX*

A series of catalysts are prepared using 2.5 gm. of a catalyst of 1:1:1.5 molar ratio of ethylaluminum sesquichloride, titanium trichloride and the following polymer anions:

$$C_4H_9(CH_2CH)_4Li;\ C_4H_9(CH_2CH)_8Li$$
$$|\quad\quad\quad\quad\quad\quad |$$
$$C_6H_5\quad\quad\quad\quad\quad C_6H_5$$

$$C_4H_9(CH_2CH)_4LiAlH_3;\ C_4H_9(CH_2CH)_8LiAl(C_4H_9)_3;$$
$$|\quad\quad\quad\quad\quad\quad\quad\quad |$$
$$C_6H_5\quad\quad\quad\quad\quad\quad\quad C_6H_5$$

$$H(CH_2CH)_{10}LiAlH_3;\ C_6H_5CH_2(CH_2\overset{CH_3}{C})_4Li;$$
$$|\quad\quad\quad\quad\quad\quad\quad\quad |$$
$$C_6H_5\quad\quad\quad\quad\quad\quad\quad C_6H_5$$

$$C_6H_5CH_2(CH_2CH)_6K;\ C_6H_5CH_2(CH_2CH)Na$$
$$|\quad\quad\quad\quad\quad\quad\quad\quad |$$
$$C_6H_5\quad\quad\quad\quad\quad\quad\quad C_6H_5$$

respectively. These are used individually to polymerize 100 g. of propylene according to the procedure of Example IV, and in all cases yields in excess of 50 g. of highly crystalline polypropylene are obtained.

By means of this invention, therefore, polyolefins, such as polyethylene, polypropylene and polymers of higher molecular weight hydrocarbons, are readily produced using a catalyst combination whose activity could not be predicted from the prior art. The polymers thus obtained can be extruded, molded, or otherwise mechanically processed such as milled, cast, etc., as desired. The polymers can be blended with the relatively more flexible high pressure polyethylenes to give any desired combination of properties. The polymers can also be combined by milling, etc., with antioxidants, stabilizers, plasticizers, fillers, pigments, and the like, or mixed with other polymeric materials, waxes and the like. In general, aside from the relatively higher values for such properties as softening point, density, stiffness and the like, the polymers prepared by this invention can be treated in similar manner to those obtained by other processes.

The novel catalysts defined above can be used to produce high molecular weight crystalline polymeric hydrocarbons. The molecular weight of the polymers can be varied over a wide range by introducing hydrogen to the polymerization reaction, separately or in admixture with the olefin monomer. The polymers produced in accordance with this invention can be separated from polymerization catalyst by suitable extraction procedures, for example, by washing with water or lower aliphatic alcohols such as methanol, etc.

Although the invention has been described in considerable detail with reference to certain embodiments thereof, it is understood that variations and modifications can be effected within the spirit and scope of this invention as described hereinabove and as defined in the appended claims.

I claim:

1. The improved process of polymerizing an α-olefin hydrocarbon of the formula $CH_2=CHR$ wherein R is a hydrocarbon radical of no more than 12 carbons atoms in the presence of a catalytic mixture consisting essentially of
    (a) a compound selected from the group consisting of halides and lower alkoxides of a metal selected from the class consisting of titanium, zirconium, vanadium, chromium and molybdenum,
    (b) organo-aluminum halides having the formula $R''''_mAlX_n$ and $R''''_3Al_2X_3$ wherein $R''''$ is a hydrocarbon radical selected from the group consisting of alkyl, aryl, cycloalkyl, and cycloalkene radicals and combinations thereof, containing one to twelve carbon atoms, X represents a halogen selected from the class of Cl, Br and I, and $m$ and $n$ are integers whose sum is equivalent to the valency of Al, (c) a preformed polymeric anion having the general formula

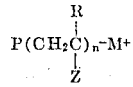

wherein

P is selected from the class consisting of H, R'' and M+,

M represents a member selected from the group consisting of alkali, alkaline earth metals, —MgX and MAlR'''$_3$ wherein R''' represents H and R'', R' is a member selected from the group consisting of H and CH$_3$, Z represents a member selected from the class of —CN, an aryl radical containing 6 to 12 carbon atoms, —CON(R'')$_2$ and —COOR'' wherein R'' represents a member selected from the class of aliphatic, cycloaliphatic, and aromatic hydrocarbon radicals containing one to twenty carbon atoms, $n$ represents a numerical value of at least 4, the molar ratio of catalyst components a:b being within the range of 1:0.25 to 1:5, and the ratio of components c:b being within the range 10:1 to 1:5.

2. The process of claim 1 in which P in the formula

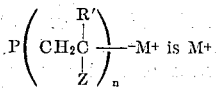 is M+

3. The process of claim 2 in which the molar ratio of catalyst components a:b:c is within the range of 1:0.25: 0.025 to 1:5:50.

4. The process of claim 2 in which the molar ratio of the catalyst components a:b:c is within the range of 1:0.5: 0.25 to 1:2:6.

5. The process of claim 3 in which the olefin is propylene.

6. The process of claim 3 in which the olefin is butene-1.

7. The process of claim 3 in which the olefin is vinyl cyclohexene.

8. The process of claim 5 in which the transition metal is TiCl$_3$.

9. The process of claim 6 in which the transition metal is TiCl$_3$.

10. The process of claim 2 in which the anion is

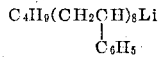

11. The process of claim 8 in which the anion is

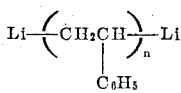

12. The process of claim 8 in which the anion is

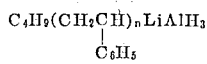

13. The process of claim 8 in which the anion is

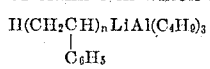

14. The process of claim 8 in which the anion is

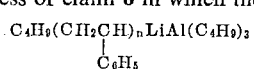

15. The process of claim 8 in which the anion is

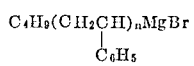

16. The process of claim 8 in which the anion is

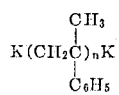

17. The process of claim 9 in which the anion is

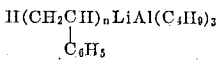

18. The process of claim 11 in which the aluminum compound is ethylaluminum dichloride.

19. The process of claim 11 in which the aluminum compound is diethyl aluminum chloride.

20. The process of claim 11 in which the aluminum compound is ethyl aluminum sesquichloride.

21. The process of claim 12 in which the aluminum compound is diethyl aluminum chloride.

22. The process of claim 12 in which the aluminum compound is ethylaluminum dichloride.

23. The process of claim 12 in which the aluminum compound is ethylaluminum sesquichloride.

24. A composition of matter suitable as a polymerization catalyst consisting essentially of (a) a compound selected from the group consisting of halides and lower alkoxides of a metal selected from the class of titanium, zirconium, vanadium, chromium and molybdenum, (b) an organo-aluminum halide having the formula R''''$_m$AlX$_n$ and R''''$_3$Al$_2$X$_3$ wherein R'''' is a hydrocarbon radical selected from the group consisting of alkyl, aryl, cycloalkyl, and cycloalkene radicals and combinations thereof, containing one to twelve carbon atoms, X represents a halogen selected from the class of Cl, Br, and I, and $m$ and $n$ are integers whose sum is equivalent to the valency of Al, (c) a preformed anion having the general formula

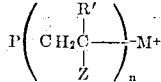

wherein

P is selected from the class consisting of H, R'' and M+,

M represents a member selected from the group consisting of alkali and alkaline earth metals, —MgX and MAlR'''$_3$ wherein R''' represents H and R'', R' is a member selected from the group consisting of H and CH$_3$, Z represents a member selected from the class of —CN, an aryl radical containing six to twelve carbon atoms, —CON(R'')$_2$ and —COOR'' wherein R'' represents a member selected from the class of aliphatic, cycloaliphatic, and aromatic hydrocarbon radicals containing one to twenty carbon atoms, $n$ represents a numerical value of at least 4.

References Cited by the Examiner

UNITED STATES PATENTS 3,109,838  11/1963  Chatt et al. _____ 260—93.7

FOREIGN PATENTS 1,222,575  6/1960  France.

JOSEPH L. SCHOFER, *Primary Examiner.*

M. B. KURTZMAN, *Assistant Examiner.*